United States Patent [19]

Desrosiers et al.

[11] Patent Number: 4,638,590
[45] Date of Patent: Jan. 27, 1987

[54] HUMANE ANIMAL TRAP

[76] Inventors: Wilfrid Desrosiers, 6 Cournoyer Street, Kapuskasing, Ontario, Canada, P5N 2N1; Gaston Labelle, 58 Government Road, Kapuskasing, Ontario, Canada, P5N 1X2

[21] Appl. No.: 774,476

[22] Filed: Sep. 10, 1985

[51] Int. Cl.⁴ ............................................. A01M 23/26
[52] U.S. Cl. .......................................... 43/88; 43/81; 43/62; 43/82; 43/92
[58] Field of Search .................. 43/81, 88, 92, 93, 94, 43/95, 62, 82

[56] References Cited

U.S. PATENT DOCUMENTS

| 462,343 | 11/1891 | Wells | 43/81 |
| 654,928 | 7/1900 | Taylor | 43/81 |
| 2,273,738 | 2/1942 | Taylor | 43/81 |
| 4,481,730 | 11/1984 | Dickinson | 43/81 |

FOREIGN PATENT DOCUMENTS 1040856 10/1978 Canada ................................. 43/88

Primary Examiner—Nicholas P. Godici
Assistant Examiner—Karen Skillman

[57] ABSTRACT

A humane animal trap comprised of two pairs of laterally-spaced arms of spring wire material. Each pair of arms merges at its rear ends with a coil spring portion which strongly biases the two arms of each pair together. One arm of each pair is forwardly joined to a rigid transverse striking bar adapted to be set in upwardly-vertically-spaced relation to the lower arms of each pair, whereby releasing the striking bar causes it to descend with sufficient force to instantly section the spinal cord of an animal. Setting means and release means are provided to achieve this. A locking means is further provided to prevent injury while setting the trap. An alternate embodiment is adapted to trap smaller animals.

6 Claims, 12 Drawing Figures

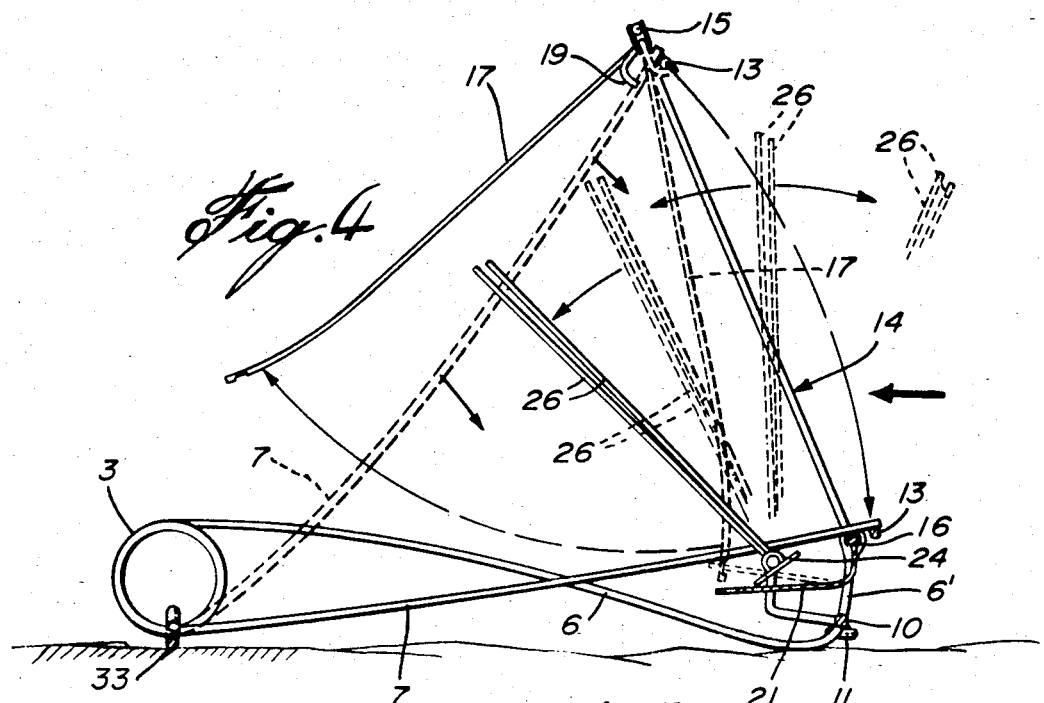
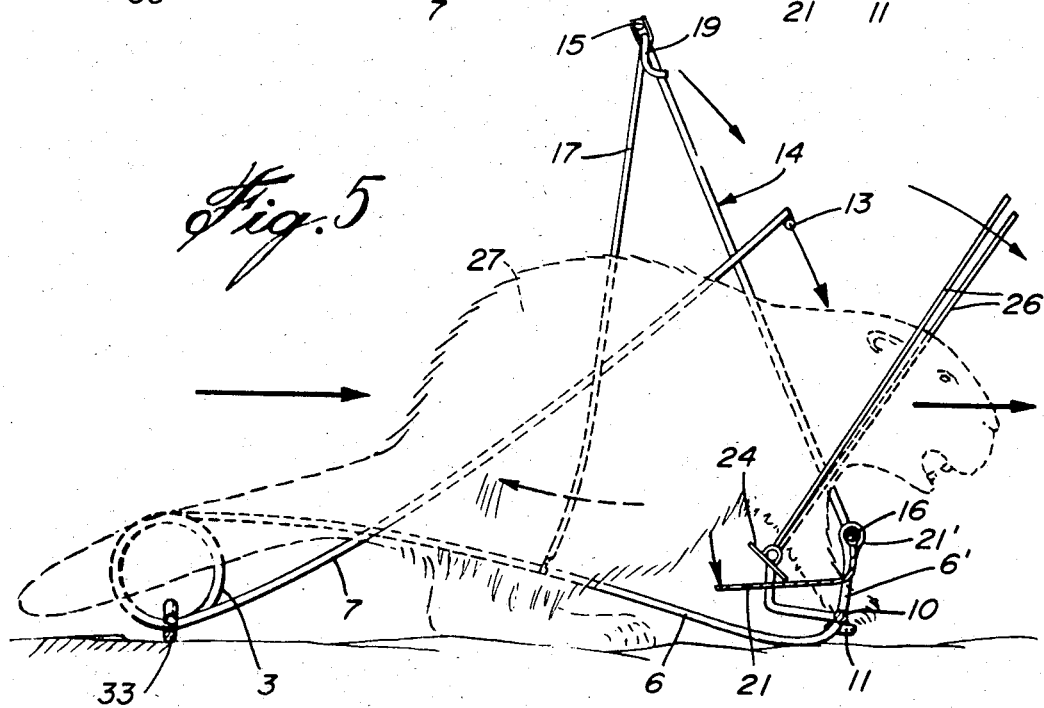

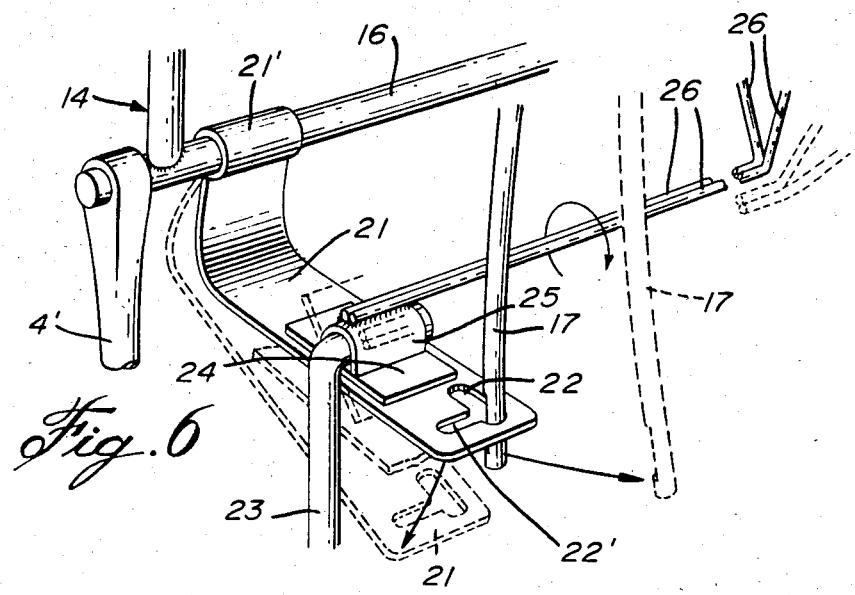
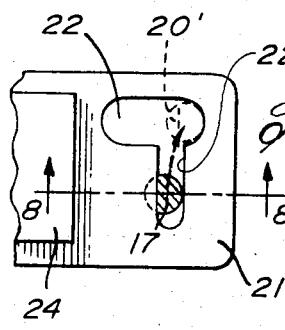
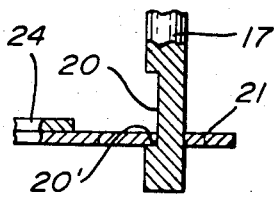
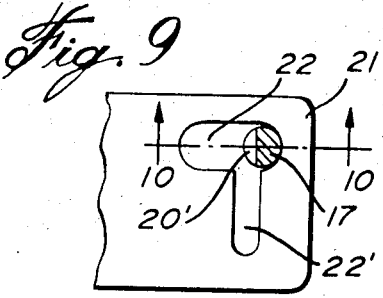
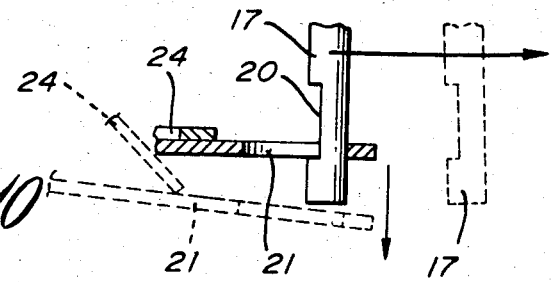

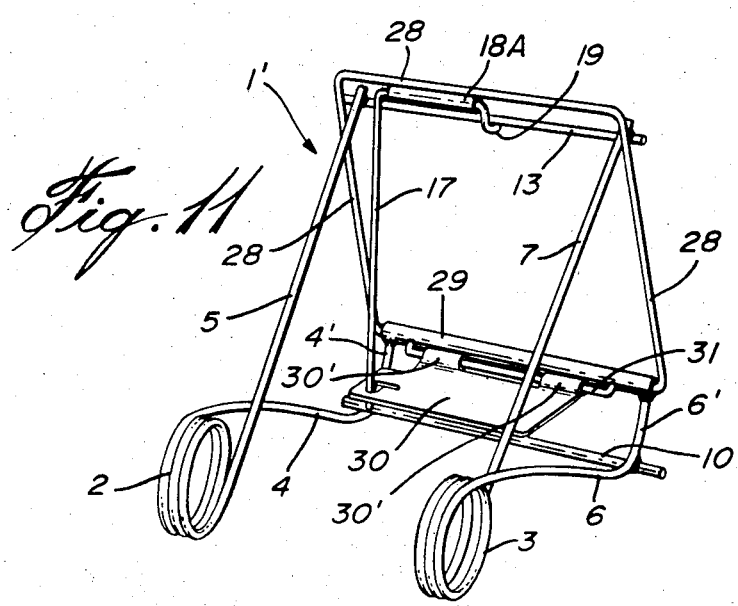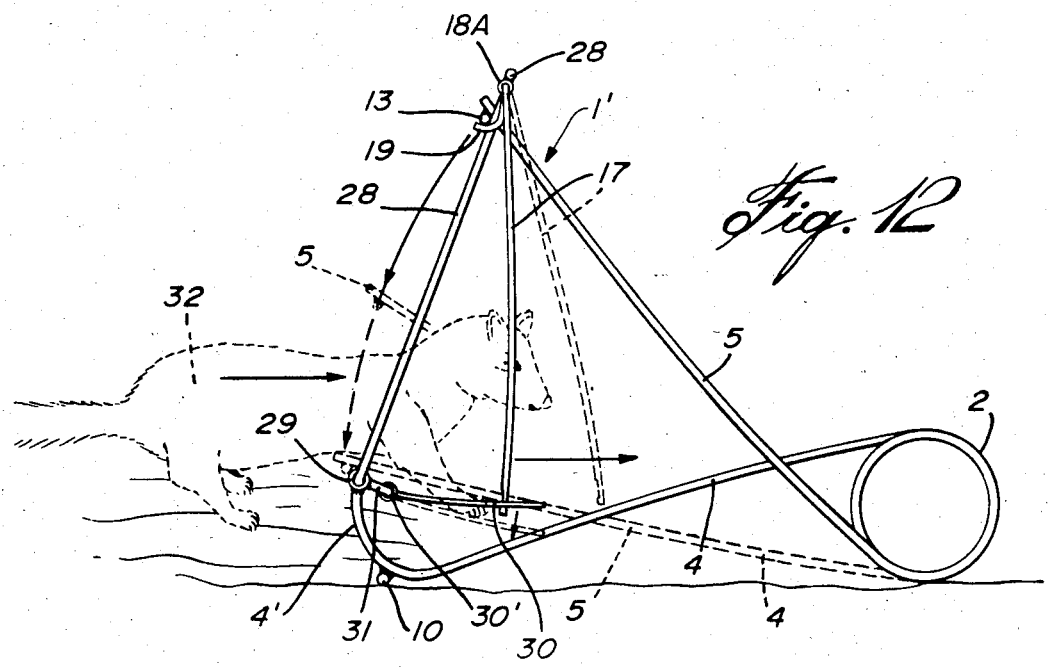

HUMANE ANIMAL TRAP

FIELD OF THE INVENTION

The present invention relates to animal traps and snares, specifically to a trap designed to instantly kill an animal caught therein.

BACKGROUND OF THE INVENTION

Conventional animal traps such as used by trappers consist of a loop concealed on the ground in which bait is put and connected to a release device. When the latter is tripped by an animal, the loop is instantly tightened around a leg of the animal to hold it fast. Such traps are cruel, because the animal, being unharmed, will pull on the noose to get away, tightening the noose all the more. If the trap is not visited regularly, as is often the case, the trapped animal will die of exhaustion, lack of food or cold, and some have even been known to gnaw off the trapped leg to get away. Moreover, the fur of the animal can be damaged by such inhumane practice, thereby adding, needless waste to the animal pain.

OBJECTS OF THE INVENTION

It is therefore a prime object of the present invention to provide an animal trap which kills the animal instantly by severing its spinal column.

It is another object of the present invention to provide an animal trap which is of simple, strong and economical construction.

SUMMARY OF THE INVENTION

The above and other objects and advantages of the present invention are realized according to a preferred embodiment comprising two pairs of spaced-apart, parallel arms made of rigid resilient material. Each pair joins at one of their ends with a coil spring portion which strongly biases the two integral arms together. The two arms of each pair generally preferably lie in the same vertical plane. One arm of each pair is adapted to contact the ground at its forward end, the latter being preferably provided with attachment means and both arms are joined by a rigid crossmember at this forward end.

The forward ends of both other arms of each pair are rigidly joined together by a transverse striking bar.

The latter two arms joined by the striking bar are adapted to be set in an upward vertically-spaced position relative to the first-mentioned arms and against the force of the two coil spring portions.

A setting means to releasably set the striking bar in this upper position is located at the forward end of the trap, consisting of a setting member having a outer transversely-horizontal retaining segment. The setting member is rigidly secured to an axially pivotal member, or, in an alternate embodiment, is integrally formed with the pivotal member. The retaining rod connects to a release means at the forward end of the trap and preferably to one side, so that an animal can be lured into the trap.

The release means includes a trip member which, when depressed by the animal, releases the striking bar and further includes a lock means which effectively prevents the trap from being sprung inadvertently while it is being set.

The main embodiment further preferentially includes bait support means to put the bait above ground level.

BRIEF DESCRIPTION OF THE DRAWINGS

The above will be more clearly understood by referring to the preferred embodiments of the invention, illustrated by way of the accompanying drawings, in which:

FIG. 4 is another cross-sectioned side elevation of the trap of FIG. 1 shown in partially-collapsed configuration;

FIG. 5 is a view similar to that of FIG. 4 showing in dashed outline a beaver in the trap;

FIG. 6 is a perspective view of the release device means in set configuration;

FIG. 7 is a top plan view of the lock means seen at the front portion of FIG. 6 and in locked position;

FIG. 8 is a cross-sectional view taken along lines 8-8 of FIG. 7;

FIG. 9 is another top plan view of the lock means in unlocked or set position;

FIG. 10 is a cross-sectional view taken along lines 10-10 of FIG. 9;

FIG. 11 is a perspective view of an alternate embodiment of the trap; and

FIG. 12 is a side elevation of the trap of Figure 11 showing an animal such as an otter shown in dotted lines entering the trap.

Like numerals indicate like elements throughout the drawings.

DETAILED DESCRIPTION OF THE PREFERRED EMBODIMENT

Figure 1:
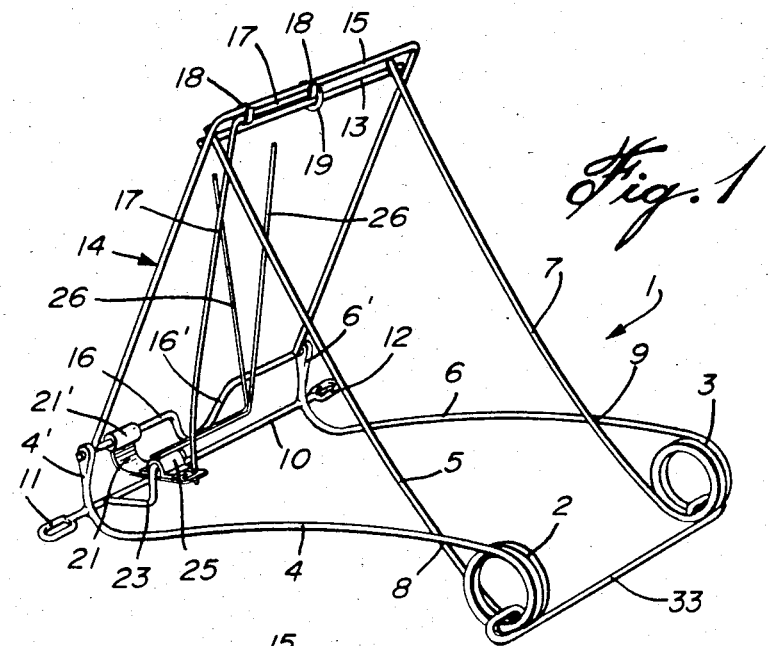
FIG. 1 is a perspective view of the main embodiment of the trap in set configuration.

Referring generally to the first ten figures of the drawings, there is shown the main embodiment of the invention. The trap 1 comprises, at its rear end, a pair of parallel, spaced-apart coil springs 2 and 3, which are joined by a stabilizer member 33. Coil springs 2 and 3 merge with a pair of forwardly-extending spring wire arms 4, 5, 6, and 7, respectively. Both pairs of arms cross over each other at 8 and 9, respectively (in set configuration)

Arms 4 and 6 are inclined downwardly past their respective cross-over points 8 and 9 and touch the ground at their forward ends, there having short vertical end portions 4' and 6'.

Arms 5 and 7 on each side of the trap are inclined upwardly in both set and rest positions.

The forward ends of arms 4 and 6 are rigidly joined, as by welding, to a cross-member 10 which projects endwise beyond the arms 4 and 6 and which is formed with endmost eyelets 11 and 12, the latter constituting attachment means to secure trap 1 to the ground by pegs, for example (not shown).

The forward ends of arms 5 and 7 are also joined by a rigid transverse striking bar 13.

Coil springs 2 and 3 strongly bias arms 4 and 6 towards arms 5 and 7.

As best seen in FIG. 1, the trap 1 is set by setting arms 5 and 7 upwardly against the combined force of springs 2 and 3.

To accomplish this, a setting means is provided, consisting of an inverted U-shape setting member 14. The outer transverse portion 19 of member 14 serves as a retaining rod segment. Setting member 14 is rigidly secured at its inner ends to an axially pivotal member 16 journalled in the upper ends of vertical end portions 4' and 6'. Member 16 is formed with a central bend 16'.

The release means comprises the following elements: an L-shape release rod 17, whose shorter arm is pivotally attached to the retaining segment 15 of member 14 by brackets 18. The end of the shorter arm is bent into a hook 19 adapted to retain striking bar 13 in set position and in upwardly-spaced relation to cross-member 10. The longer arm of release rod 17 is formed at its end 7 to 10).

Referring specifically to FIGS. 6 to 10, there are shown the other elements of the release means, including a thin tripping plate 21 bent orthogonally at its forward end and pivotally secured to member 16 by a sleeve 21' Plate 21 is formed with an L-shape slot including a wide longitudinal portion 22 and a narrower transverse portion 22', whose function is explained shortly.

The release means further includes a doubly-bent support bar 23 fixed to cross-member 10 and having a free end extending over plate 21 forwardly of slot 22. Mounted around this free end is a U-shape clamp 25 which is secured centrally of a short flat strip 24. Clamp 25 and strip 24 are thus free to pivot around the free end of bar or rod 23. A pair of parallel wire members 26 are secured laterally to the top of clamp 25, extend laterally to the center of the trap and are then bent upwardly, terminating short of the retaining segment 15 of setting member 14. The free ends of both wire members 26 constitute the bait support means and are preferably spaced apart, as shown.

The procedure to set the trap is quite simple: firstly, setting member 14 is pulled to its generally upright setting position and release rod 17 is positioned with its free end in the transverse portion 22' of the slot formed in plate 21. This is the locking means mentioned above since upward force exerted on release rod 17 will be countered by shoulder 20' of notch 20, as best seen in FIG. 8. The width of slot portion 22' is such as to closely contact the face of notch 20. (see FIG. 7) Preferably, release rod 17 is slightly arched for best results. Secondly, arms 5 and 7, with their striking bar 13, are pulled upwardly to engage the latter with hook 19 of release rod 17. Thirdly, the notched portion 20 of rod 17 is moved to rest in the rear semi-circular indentation of slot portion 22.

It is to be noted that the lower end of release rod 17 may be positioned very close to plate 21 for >hair-trigger< release if desired.

Figure 2:
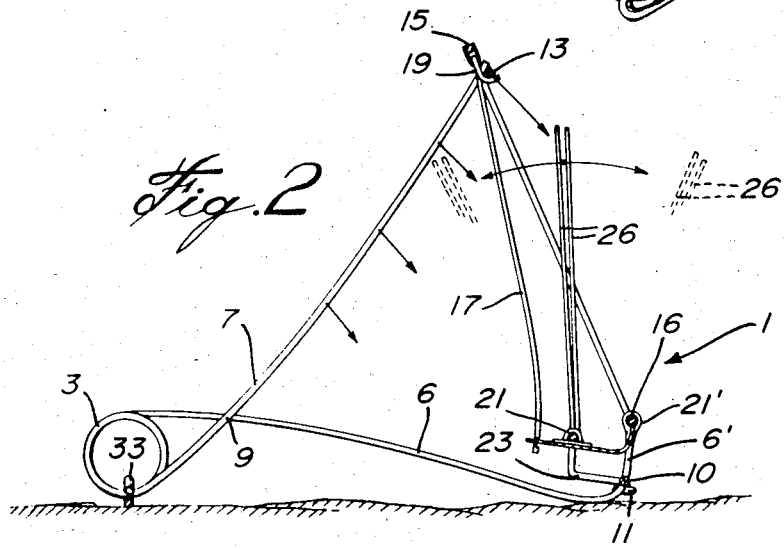
FIG. 2 is a cross-sectioned side elevation of the trap shown in FIG. 1, wherein the arrows indicate direction of movement.
Figure 3:
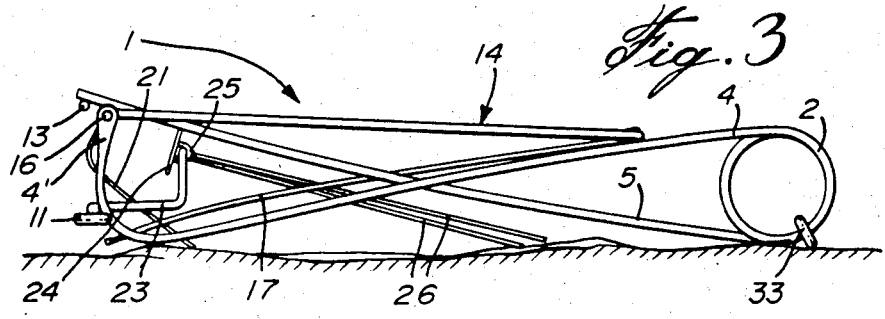
FIG. 3 is another cross-sectioned side elevation of the trap of FIG. 1 but in sprung configuration.

Trap 1 works in the following way and as depicted in FIGS. 2, 4, and 5. Supposing an animal, such as a beaver 27, enters the trap from the rear, attracted by the bait. As beaver 27 nibbles at the bait, wires 26 are pushed frontwardly, causing plate 24 to pivot against plate 21 to force the latter downwardly until release rod 17 clears it. Striking bar 13 is then released from hook 19 and comes down with sufficient force to sever the spinal cord of beaver 27 at its neck. If an animal enters the trap from the front, the same will happen. Release rod 17 flies rearwardly when released, because of a rearward vector component to the force exerted on rod 17, while wires 26 may fall in either direction.

FIGS. 11 and 12 illustrate a slightly-modified alternate embodiment of the invention. The following elements are unchanged: coil springs 2 and 3; arms 4, 5, 6, and 7; vertical end portions 4', 6'; cross-member 10; striking bar 13; release rod 17; and hook 19.

The following elements are embodied as modifications: a setting member 28 in the form of a rectangular frame having its lower segment extending through a transverse sleeve 29; a second sleeve 18A replacing brackets 18 to pivotally retain release rod 17 to setting member 28; an elongated transverse tripping plate 30; a hinge rod 31 secured at both its ends to sleeve 29, plate 30 being pivotally secured to hinge rod 31 by hinges 30'.

The trap of FIGS. 11 and 12 functions in almost exactly the same way as described above: the bait is put directly on plate 30, and the animal entering the trap puts its paws on the plate 30 to spring the trap. This trap is more efficacious for smaller animals, such as otter 32.

What we claim is:

1. An animal trap comprising two pairs of spaced-apart and parallel first and second arms made of a resilient material and having forward and rearward ends, both arms of each of said pairs being integrally formed at their rearward ends with a coil spring portion; the latter biasing the two arms of each pair towards each other; each first arm having an upturned forward end potion and adapted to contact with the ground on which the trap is placed; a transverse abutment member joining each said upturned forward end portion; a rigid transverse striking bar being adapted to be set in vertically-spaced relation to the transverse abutment member against the biasing force of the two coiled spring portions; setting means to set said striking bar in said vertically-spaced relation and comprising: a frame-like setting member having an inner part pivoted to each said upturned forward end potion and having an outer transverse retaining segment which extends above said striking bar in the set position of the latter; release means to release said striking bar, said release means including a hook means pivotally mounted on said outer retaining segment and releasably engaging said striking bar, and trigger means actuatable by an animal to release said hook means; wherein said hook means includes a hook and a release rod to pivot said hook, said release rods extending downwardly from said outer retaining segment when in said set position; said trigger means including a tripping plate having an inner end pivotally secured to said transverse abutment member and an outer end portion formed with a slot adapted to releasably retain the lower end portion of said release rod; depression of said tripping plate releasing said release rod.

2. An animal trap as defined in claim 1, wherein said tripping plate is conformed to be stepped upon by an animal to release said release rod.

3. An animal trap as defined in claim 1, further including a rigid cross member joining the upturned forward end portions of said first arms and wherein said trigger means further includes a support bar fixed to said cross member at one end and having a free end extending over said tripping plate forwardly of said slot; a sleeve-like member rotatably carried by said support bar free end and having opposite extensions selectively engageable with said tripping plate to depress the latter irrespective of the direction of rotation of said sleeve-like member; and bait-supporting wire members secured to and upstanding from said sleeve-like member and extending within the frame-like setting member in the set position of the trap, whereby when said bait-supporting wire members are rotated by an animal in either direction, said tripping plate will be depressed by one of said extensions, freeing said release rod and causing said striking bar to descend.

4. An animal trap as defined in claim 1, wherein said hook and said release rod are formed of a unitary L-shaped rod having a shorter arm pivotally attached to and extending along said outer retaining segment and formed with said hook at its free end, and a longer arm forming said release rod.

5. An animal trap as defined in claim 1, wherein said release means includes a safety locking means.

6. An animal trap as defined in claim 5, wherein said striker bar biases said release rod to pivot in a rearward direction, and said locking means includes; a forwardly-facing notch formed in the lower end portion of said release rod; said forwardly-facing notch defining a lower shoulder; a slot portion disposed at a right angle to and communicating with said tripping plate slot; the width of said slot portion conforming to the diameter of said release rod at the said forwardly-facing notch.

* * * * *